United States Patent [19]

Avery

[11] 4,279,575
[45] Jul. 21, 1981

[54] TURBINE ROTOR

[75] Inventor: Peter Avery, Derby, England

[73] Assignee: Rolls-Royce Limited, London, England

[21] Appl. No.: 954,083

[22] Filed: Oct. 24, 1978

[30] Foreign Application Priority Data

Nov. 19, 1977 [GB] United Kingdom .............. 48270/77

[51] Int. Cl.³ .................................................. F01D 5/08
[52] U.S. Cl. .......................... 416/244 A; 416/241 A; 416/241 B
[58] Field of Search ........... 416/241 R, 241 A, 241 B, 416/244 A, 95

[56] References Cited

U.S. PATENT DOCUMENTS

| | | | |
|---|---|---|---|
| 1,504,736 | 8/1924 | Brown | 416/241 |
| 2,709,569 | 5/1955 | Roush | 416/241 |
| 3,144,349 | 8/1964 | Swingler et al. | 416/241 |
| 3,262,674 | 7/1966 | Huebner, Jr. et al. | 416/244 A |
| 3,373,485 | 3/1968 | Nelsen | 29/598 |
| 3,664,766 | 5/1972 | Rahnke | 416/244 A |
| 3,748,110 | 7/1973 | Hodshire et al. | 416/241 |
| 3,973,875 | 8/1976 | Bird | 416/244 A |
| 4,141,127 | 2/1979 | Cretella et al. | 29/156.8 B |

FOREIGN PATENT DOCUMENTS

| | | | |
|---|---|---|---|
| 2815457 | 10/1978 | Fed. Rep. of Germany | 416/95 |
| 535566 | 4/1941 | United Kingdom | 416/244 A |

OTHER PUBLICATIONS

*Modern Plastics*, Jun., 1946, pp. 134-135, "A New Industrial Resin".
*Product Engineering*, vol. 44, No. 5, May, 1973, pp. 20-23, "Power Spray Coatings".
*Steel*, Jan. 24, 1949, pp. 59-82, "High-Temperature Ceramic Coatings".
*Mechanical Engineering*, vol. 87, No. 3, Mar., 1975, pp. 52-57, "Protective Coatings for Turbine Parts".

*Primary Examiner*—Everette A. Powell, Jr.
*Attorney, Agent, or Firm*—Cushman, Darby & Cushman

[57] ABSTRACT

A machined-to-size superalloy turbine rotor disc for a gas turbine engine has its fatigue life increased by coating its fatigue-prone machined surfaces with an air-impervious protective layer of material which retains its integrity and adherence to the machined surfaces for a large number of mechanical and heat stress cycles.

4 Claims, 2 Drawing Figures

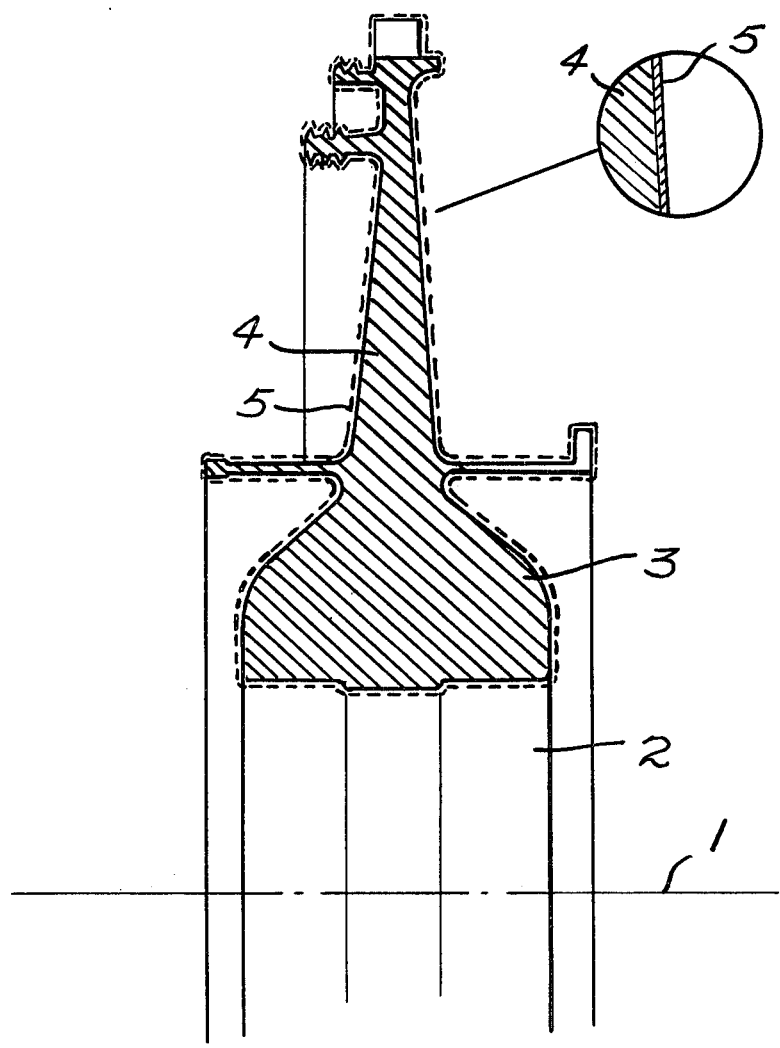

TURBINE ROTOR

This invention relates to methods of improving the fatigue lives of machine components, especially turbine rotor discs of gas turbine engines.

Some components of gas turbine engines, such as turbine rotor discs, which experience periodic cyclic stresses of large amplitude at high temperatures, are prone to have short fatigue lives. This is obviously undesirable on grounds of expense, convenience and safety, and engineers are constantly seeking ways of increasing the fatigue lives of the discs.

The high pressure turbine rotor discs of a modern gas turbine aero-engine are made of nickel-base alloys, cobalt-base alloys, or other corrosion-resistant super-alloys. When in the engine under operational conditions, these rotor discs experience periodic large variations in mechanical and heat stresses. Under these conditions, the major limiting factor on the fatigue lives of the rotor discs is the number of stress cycles undergone by each disc, and therefore it is usual to measure their fatigue lives by the number of standard stress cycles they have experienced.

Damaging fatigue cracks tend to originate from imperfections in the surface layers of the rotor discs, and it is now recognised that the method of metal removal used during manufacture of a component can have a great effect on fatigue life. Surface finish factors, such as roughness and orientation of machining marks have long been known to have an effect on fatigue life. However, the surface condition left by the final machining process also has an effect. Adverse surface conditions include such factors as residual stresses, plastic deformation, micro-cracking and metallurgical phase changes in the surface layer of material.

For instance, some alloys used in the manufacture of turbine discs are particularly prone to suffer work-hardening of the surface during turning operations. The extent of this surface damage is thought to be dependent on the method of turning (e.g. depth of cut and type of tool).

One known way of counteracting the bad surface conditions just mentioned is to remove or partially remove the damaged surface layer using processes which themselves do not significantly damage the new surface. One such process is "vapour blasting", in which the affected surface is impinged by jets of a slurry comprising small particles of aluminium oxide in water. Typically the jets are discharged at a pressure of 80 psi, and the grit size is 120/220 mesh. Vapour blasting has the effect of removing at least the worst of the damaged surface layer produced during earlier metal removal, and in this way the fatigue life of the rotor disc can be significantly improved.

Note that although vapour blasting has been specifically mentioned, any other suitable abrasive blasting technique could be used for the purpose. Alternatively, other methods of removing or partially removing the damaged surface layer can be employed, such as electrolytic or chemical machining, or polishing processes.

Although reference has been made to work-hardening as a factor in reducing fatigue life, even those alloys which do not appear prone to work-hardening during metal removal operations nevertheless develop fatigue cracks in their surface layers at the high operational temperatures and mechanical stresses experienced by high pressure turbine rotor discs.

The present invention provides a cheap and unexpectedly efficacious method of increasing the fatigue life of a machined-to-size super-alloy turbine rotor disc for a gas turbine engine, said rotor disc being subject to mechanical and heat stress cycles during operation of said engine, said method being an additional step in the manufacture of said rotor disc comprising coating machined fatigue-crack prone surfaces of said rotor disc with a substantially air-impervious protective layer composed of a material which substantially retains its integrity and adherence to said machined surfaces for a large number of said mechanical and heat stress cycles.

For the purposes of this specification and the interpretation of its claims, the term "machined-to-size" includes removal of metal by turning, milling, grinding, etc., and also by abrasive blasting, electrolytic and chemical means, and polishing and deburring processes.

A preferred method of manufacture of the above-mentioned turbine rotor disc comprises the steps of:
(a) producing a rotor disc blank and then machining said blank to size by
 (i) a turning process, and, optionally
 (ii) at least partially removing any damaged surface layer of said rotor disc produced by said turning process by means which does not itself significantly damage the surface of said rotor disc; and
(b) coating machined fatigue-crack prone surfaces of said rotor disc with said substantially air-impervious protective layer.

The protective layer is advantageously of the type which can be applied initially by a spraying process and is thereafter stoved to produce the finished layer. It may comprise, for example, a thermo-setting organic resin, or alternatively an inorganic glass or ceramic. The resin or glass or ceramic may incorporate a filler material such as aluminium which is chemically compatible with the base metal of the rotor disc.

An example of a type of resin useable in the present invention is silicon epoxy resin. An example of a type of glass useable in the present invention is borosilicate glass. An example of a type of ceramic useable in the present invention is that supplied by Ferro (Great Britain) Limited under the designation RW15002.

BRIEF DESCRIPTION OF THE DRAWINGS

FIG. 2 is part of a sectional view of a typical gas turbine aeroengine rotor disc according to the present invention, the section being taken in a diametral plane including the axis of rotation of the disc.

DETAILED DESCRIPTION OF DRAWINGS AND OF LABORATORY TESTS OF THE INVENTION

Figure 1:
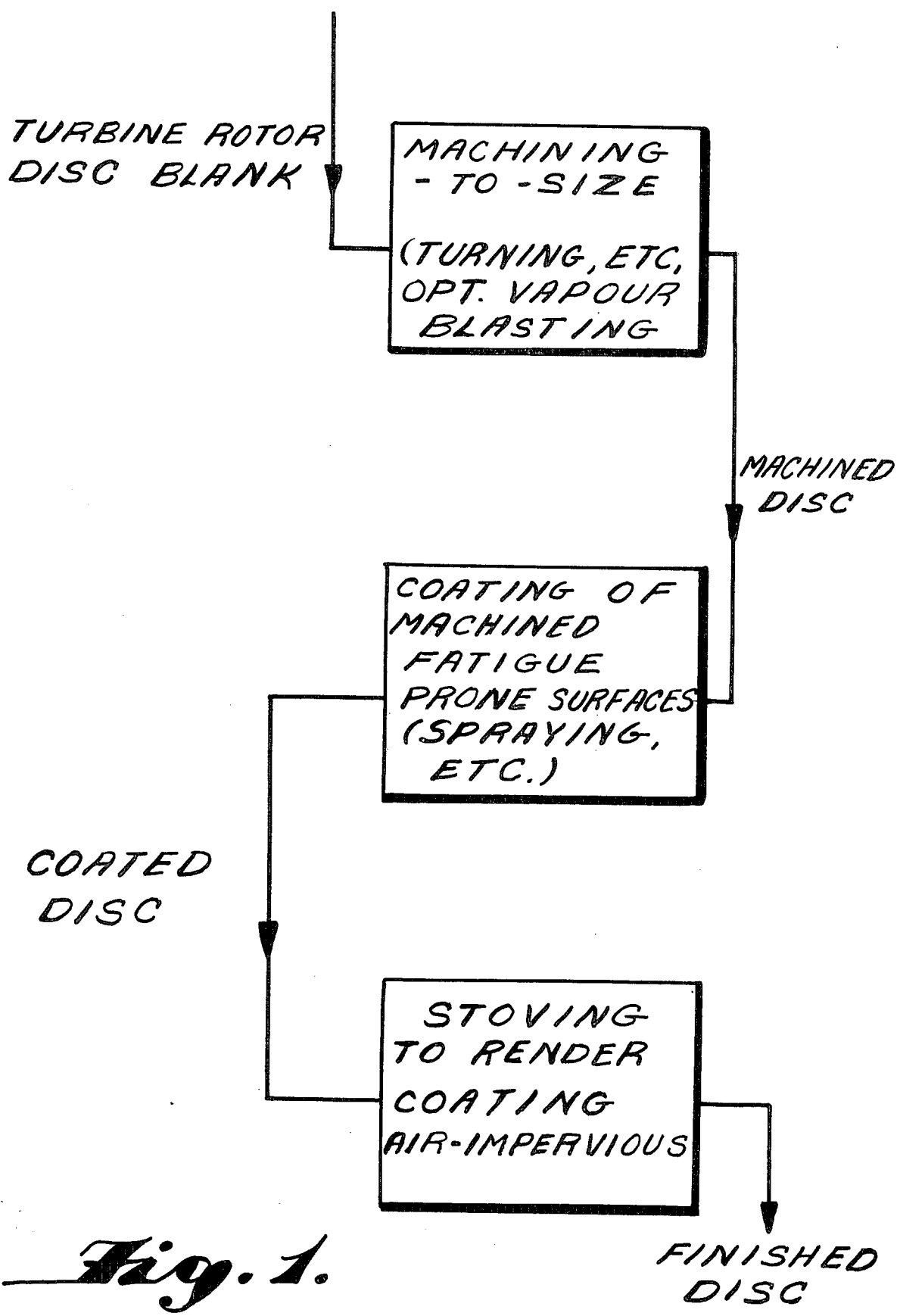
FIG. 1 is a flow diagram of a process for the production of the gas turbine rotor discs of the present invention.

Referring now to FIG. 1, this gives a brief summary of the main steps in the treatment of a rotor disc to extend its fatigue life. These steps are discussed in more detail under the heading "Preparation of Standard Specimens".

FIG. 2 shows a superalloy turbine rotor disc of a type used in the high pressure turbine of a modern large turbofan engine. The disc, which is of conventional design, has an axis of rotation 1, and a central hole 2 by means of which it is fixed to a shaft. The massive central or "cob" portion 3 of the disc surrounds the hole 2 and takes the tensile and hoop stresses generated by the turbine blades of conventional design (not shown) and the thinner outer portion 4 of the disc as it rotates.

The surfaces of the disc are machined during manufacture, and those surfaces most prone to develop fatigue cracks are coated with a layer of air-impervious material 5. The extent of this layer is indicated by dashed lines in the main part of FIG. 2, and the layer is shown more distinctly in the inset to FIG. 2, which is a magnified view of the portion of the disc section within the small circle.

As mentioned previously, the nature of the machining process has an influence on the fatigue life of the disc, depending not only upon the surface finish achieved, but also upon the work-hardening of the surface produced by the process.

In laboratory tests on specimens made from a rotor disc alloy which is prone to work-hardening of the surface layer during single-point turning to size, the present invention unexpectedly produced increases in fatigue life ranging from 90% to over 200%. Details of some of these tests will now be given to aid further understanding of the invention.

PREPARATION OF STANDARD SPECIMENS

Specimens were produced from sectorial portions, i.e. radial slices, of an annulus of material turned from the central ("cob") portion of a suitable turbine rotor disc. The annulus was recessed on each side so that a radial cross-section of the annulus exhibited an approximate "I"-shape, the surfaces of the recesses being turned to the same specifications as the machined surfaces of a production turbine disc. In order to localise fatigue failures in the specimens, they were provided with a stress concentration at one end of each recess, this being a small fillet radius between each recess and the thicker section of material flanking it. The other end of each recess was blended into the thicker section gradually by means of a curve of large radius. The small fillet radius was chosen to give a stress concentration factor of 1.35.

All the specimens mentioned herein were from the same annulus, i.e. from the same rotor disc, so that material variation between specimens would be small. The material was a nickel alloy having the nominal composition (in weight %) of:

19.5: Chromium
13.5: Cobalt
4.0: Molybdenum
3.0: Titanium
1.5: Aluminium
0.08: Zirconium
0.08: Carbon
0.005: Boron
Balance: Nickel This material is commonly sold under the trade name "WASPALOY".

After turning of the annulus was completed, twelve test specimens were cut out of it and degreased. Numbers 1 to 7 of the specimens were left in the "as machined" state, Number 8 was coated with a layer of thermosetting silicone epoxy resin which had an aluminium filler component (hereinafter called "Protective Layer A"), Number 9 was coated with a borosilicate glass filled with aluminium (hereinafter called "Protective Layer B"), and Numbers 10 to 12 were coated with a proprietry ceramic supplied by Ferro (Great Britain) Limited under their designation RW 15002 (hereinafter called "Protective Layer C"). Initial coating was accomplished using standard spray gun techniques, each layer being sprayed as a liquid. Protective Layer A was sprayed as a suspension of aluminium particles in a solvent vehicle containing the resin in solution; Protective Layer B was sprayed as a suspension of aluminium and borosilicate glass particles in a solvent vehicle containing a temporary binder in solution; Protective Layer C was sprayed as a suspension of particles in water containing a small amount of a temporary binder, such as gum arabic. Thereafter, each coated specimen required stoving at a suitable reaction or fusing temperature in order to produce the finished substantially impervious resin, or fused glass or ceramic protective layer. During stoving the temporary binders in Protective Layers B and C were vapourised and driven out of the layers by the heat.

TEST PROCEDURE

The specimens were tested to failure in groups of three on a fatigue testing rig which applied the cyclic stressing as a square wave load pattern with 2 seconds on load and 2 second off. In all the tests the specimens were at a temperature of 550° C., to simulate the operating temperature of high pressure turbine rotor discs in a gas turbine aeroengine, and were loaded to produce 70 tons per square inch elastic stress at the fillets.

Inspection for fatigue cracks was carried out using the fluorescent penetrant method. Uncoated specimens 4, 5 and 6 were inspected for cracks every 1000 cycles whilst still on the testing rig. The coated specimen 12 was removed from the testing rig twice for crack inspection. This involved stripping off the protective layer, crack inspection, respraying, and stoving each time.

Table 1 below gives the test results for the twelve specimens.

TABLE 1

| SPECIMEN NO. | SURFACE CONDITION | CYCLES TO FAILURE | FAILURE MODE | COMMENTS |
|---|---|---|---|---|
| 1 | AS MACHINED | 11 529 | MULTI-ORIGIN | |
| 2 | AS MACHINED | 11 739 | MULTI-ORIGIN | |
| 3 | AS MACHINED | 15 559 | MULTI-ORIGIN | |
| 4 | AS MACHINED | 11 087 | MULTI-ORIGIN | CRACK FREE AT 6000 CYCLES FOUND CRACKED AT 7000 CYCLES |
| 5 | AS MACHINED | 14 416 | MULTI-ORIGIN | CRACK FREE AT 6000 CYCLES FOUND CRACKED AT 7000 CYCLES |
| 6 | AS MACHINED | 12 503 | MULTI-ORIGIN | CRACK FREE AT 6000 CYCLES FOUND CRACKED AT 7000 CYCLES |
| 7 | AS MACHINED | 14 194 | MULTI-ORIGIN | TESTED IN SAME LOAD GROUP AS SPECIMENS 11 AND 12 |
| 8 | PROTECTIVE | 24 628 | SINGLE | |

TABLE 1-continued

| SPECIMEN NO. | SURFACE CONDITION | CYCLES TO FAILURE | FAILURE MODE | COMMENTS |
|---|---|---|---|---|
| 9 | PROTECTIVE LAYER A | 36 091 | SINGLE ORIGIN | |
| 10 | PROTECTIVE LAYER B | 41 823 | SINGLE ORIGIN | |
| 11 | PROTECTIVE LAYER C | 38 309 | SINGLE ORIGIN | |
| 12 | PROTECTIVE LAYER C | 31 498 | MULTI-ORIGIN | CRACK FREE AT 14 194 CYCLES FOUND CRACKED IN BOTH FILLETS AT 28 194 CYCLES |

Note that specimens 8 to 10 were tested together in one group. Specimens 11, 12 and 7 were subsequently tested together to check that result.

DISCUSSION

Table 1 shows a clear increase in fatigue life due to the application of protective layers A, B and C. The logarithmic mean fatigue life for the seven "as machined" test results is 12 910 cycles. Based on this, Protective Layers, A, B and C surprisingly produced fatigue life improvements of 90%. 180% and 224% (maximum) respectively. One of the advantages of the invention is that these large improvements in fatigue life are achieved by a process which is inexpensive and easy to perform.

The fact that coated specimen 12 was found uncracked at the number of cycles at which the uncoated specimen 7 failed indicated that at least some of the increase in fatigue life caused by the protective layer was due to retardation of the onset of visible cracks. It was observed that uncoated specimens showed multi-origin failures, but that coated specimens (apart from specimen 12) had single origin failures; thus may be further evidence of retardation of crack initiation by the protective layers.

The multi-origin failure mode of the uncoated specimens indicates the presence of a damaged surface layer due to the turning process, despite efforts made to produce a good surface. The beneficial effect of the protective layers is felt, therefore, despite some work-hardening of the surface of the specimens.

The mechanism by which the protective layers increased the fatigue lives of the specimens is uncertain, but as mentioned above, it seems that at least part of this increase was due to retardation of the onset of visible fatigue cracks. The most effective protective layer, Protective Layer C, is also the most impervious to air. This fact seems to support the supposition that the protective layers are effective because they prevent slight surface oxidation of the metal grains at the elevated temperatures at which the tests were conducted; such oxidation would cause stress concentrations in the metal surface. Hitherto, it has not been thought necessary to apply protective coatings to gas turbine rotor discs because the alloys from which the discs are made are corrosion-resistant and do not experience the full corrosion and heating effects of the turbine gases. Hence oxidation was not recognised as having any appreciable influence on fatigue life.

Although in the above-mentioned tests the protective layers were applied to the surfaces of the specimens in their "as turned" condition (after degreasing), it is clear that some additional benefit in fatigue life might be obtained if the turned surfaces were first to be treated so as to remove some or all of the work-hardened layer produced by the turning operation, provided that the treatment itself does not produce any further significant damage to the new surface thus produced. This can be accomplished by employing a process such as the vapour blasting or electrolytic machining processes already mentioned.

I claim:

1. For a gas turbine engine, a machined-to-size superalloy turbine rotor disc having machined fatigue-prone surfaces intended to be subject to mechanical and heat stress cycles in said engine, said rotor disc having a coating on said machined fatigue-prone surfaces, said coating comprising a substantially air-impervious protective layer of a nonmetallic base material which substantially retains its integrity and adherence to said machined fatigue-prone surfaces of said superalloy turbine rotor disc without being integral therewith for a large number of said mechanical and heat stress cycles, whereby the fatigue life of said rotor disc is increased.

2. A turbine rotor disc as claimed in claim 1, said air-impervious protective layer being selected from the group consisting of thermosetting organic resins, glasses, or ceramics.

3. A turbine rotor disc as claimed in claim 2 in which said air-impervious protective layer has an aluminum filler material therein.

4. A turbine rotor disc as claimed in any of claims 1, 2 or 3 in which said superalloy turbine rotor disc is made from a superalloy material selected from a nickel-base alloy or a cobalt-base alloy.

* * * * *